Jan. 16, 1923.

H. D. CHURCH.
MOTOR VEHICLE.
FILED JAN. 9, 1919.

Inventor,
Harold D. Church,
By Foster, Freeman, Watson & Coit,
Atty.

Jan. 16, 1923.
H. D. CHURCH.
MOTOR VEHICLE.
FILED JAN. 9, 1919.
1,442,049.
3 SHEETS—SHEET 2.
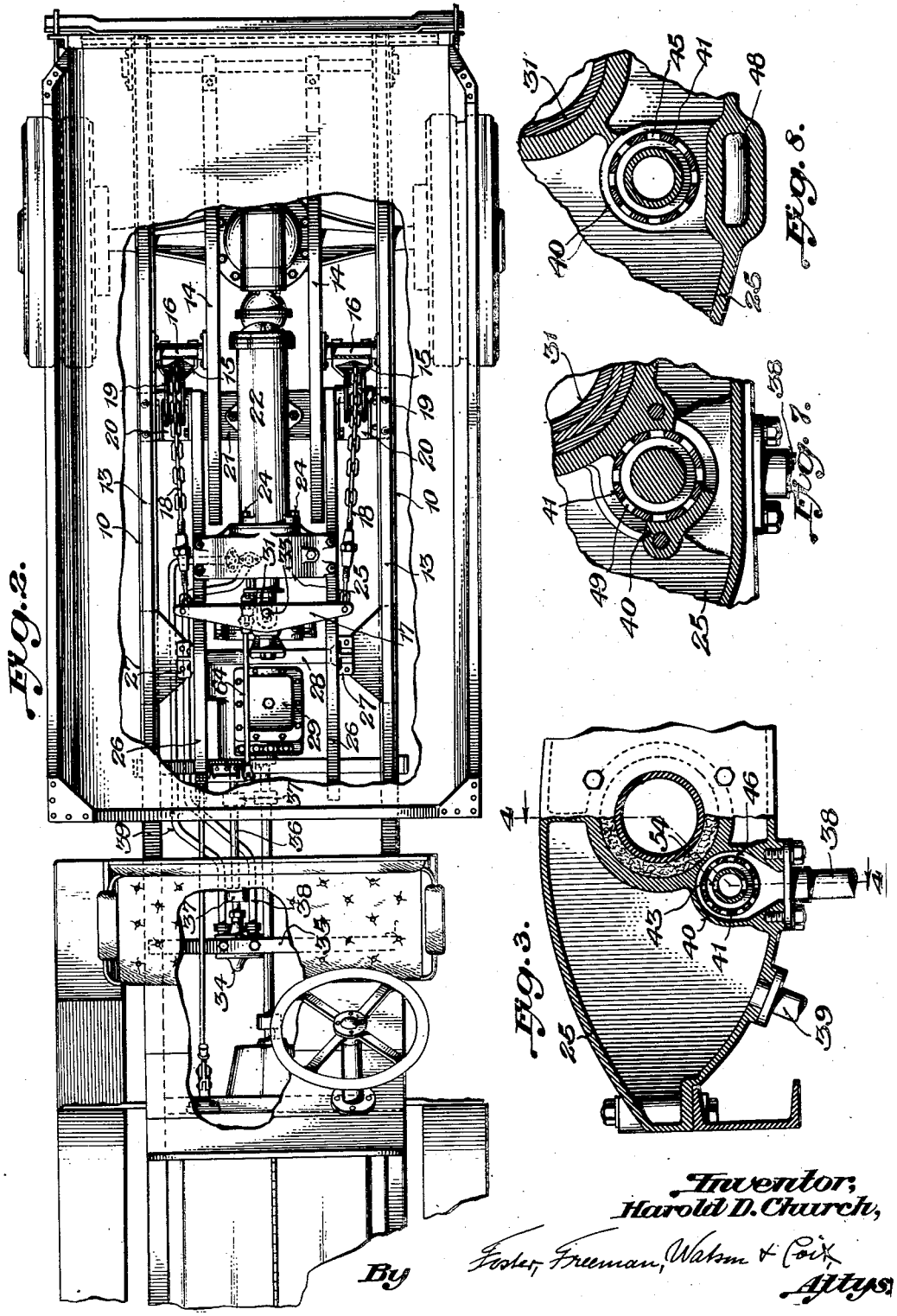
Inventor;
Harold D. Church,
By Foster, Freeman, Watson & Coit
Attys.

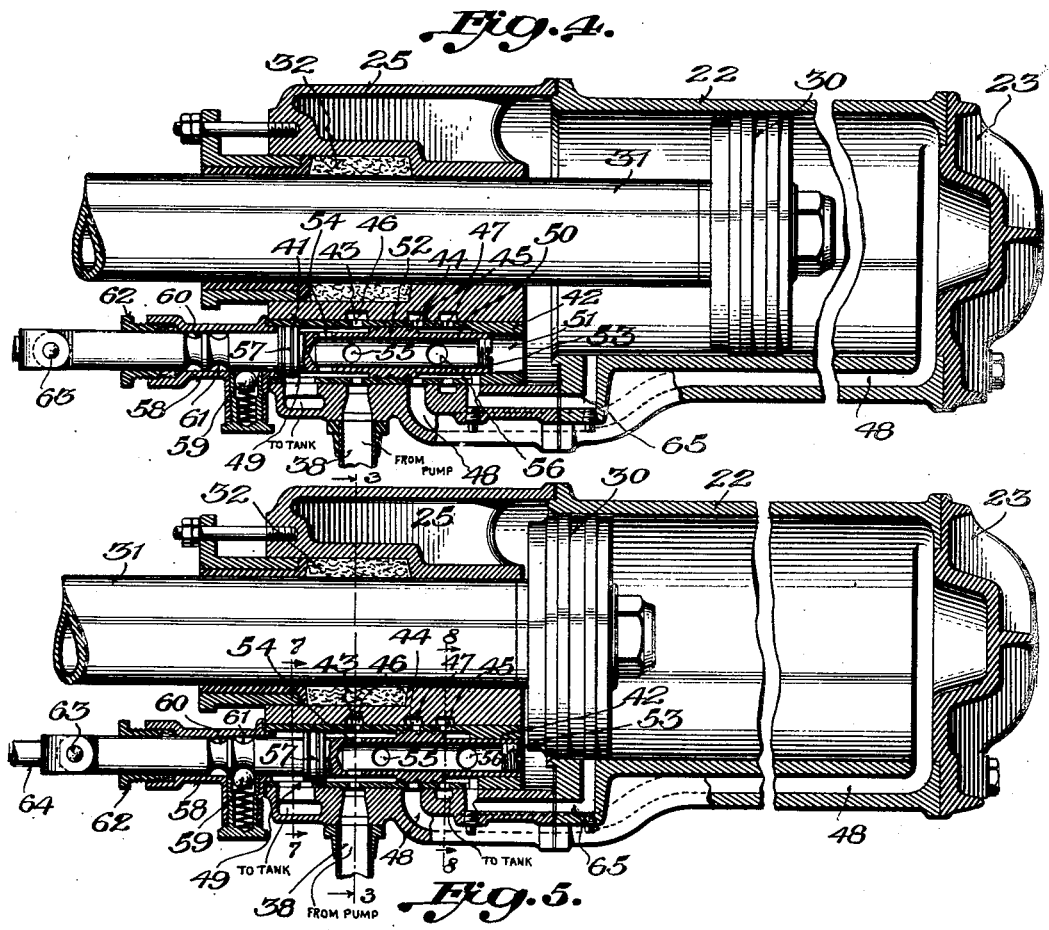
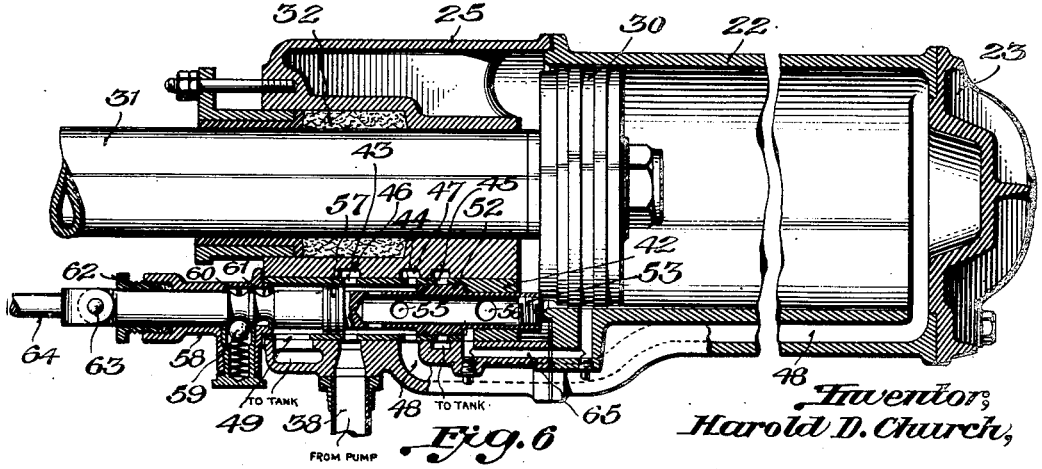

Patented Jan. 16, 1923.

1,442,049

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed January 9, 1919. Serial No. 270,324.

*To all whom it may concern:*

Be it known that I, HAROLD D. CHURCH, a citizen of the United States, and resident of Detroit, Wayne County, State of Michigan, have invented certain new and useful Improvements in Motor Vehicles, of which the following is a specification.

The present invention relates to motor vehicles and more particularly to such vehicles having dumping bodies.

The principal novel features of the invention reside in the arrangement and mounting of the apparatus for operating the dumping body; in the provision of an elevating motor having no stuffing box subject to fluid pressure; in the securing of a single acting reciprocating motor directly to a tank or reservoir; in the mounting and drive of the pump; in the improved valve for controlling the operation of the motor; in locating the valve within the said tank, thereby reducing the number of joints and connections otherwise required; in the provision of a substantially three point support for the motor and tank considered as a unit; and the provision of a continuously running pump in combination with the means for controlling the operation of the motor.

Other features and objects of the invention will be apparent from the description taken in connection with the drawings in which:—

Figure 2 is a plan view of the vehicle shown in Figure 1, certain parts being broken away;

Figure 3 is an end elevation of the reservoir or tank, half thereof being shown in section taken substantially on the line 3—3 of Figure 5;

Figure 4 is a longtiudinal sectional view taken substaintially on the line 4—4 of Figure 3, illustrating the position of the valve when the body of the vehicle is descending or being lowered;

Figure 5 is a similar view but showing the valve in the position to hold the body in raised position;

Figure 6 is a view similar to Figure 4 but showing the valve in the position to effect raising of the body;

Figure 7 is a sectional detail view taken substantially on the line 7—7 of Figure 5; and Figure 8 is a similar view taken substantially on the line 8—8 of Figure 5.

Figure 1:
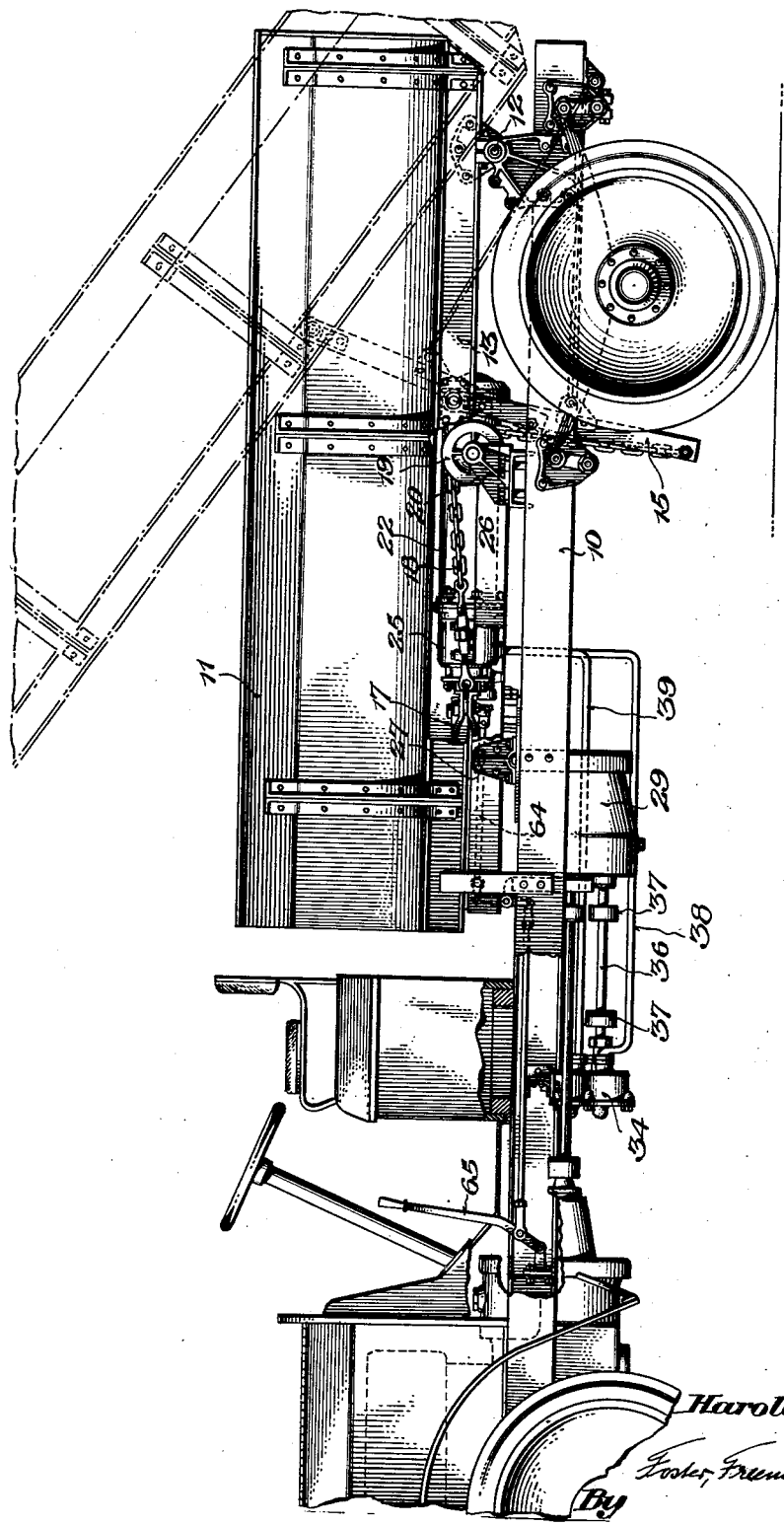
Figure 1 is a side elevation of a vehicle equipped with apparatus constructed in accordance with the present invention, certain parts being broken away.

Referring to the drawings which illustrate the at present preferred form of the invention, the numeral 10 indicates the usual side members of the frame of a motor vehicle. A dumping body 11 is pivotally supported as at 12 near the rear end of the vehicle frame. This body includes the bottom supporting members 13 disposed substantially in the same vertical planes as the side members 10 of the vehicle frame, and the members 14 disposed between the side members 13. The mechanism for tilting the body includes two links 15, the upper end of each of these links being pivotally mounted on a pin 16 secured to the bottom members 13 and 14. A yoke member 17 is given a movement longitudinally of the vehicle as will be described hereinafter and has its opposite ends operatively connected to the lower ends of the links 15 by means of the chains 18. As shown these chains extend rearwardly from the yoke 17 and pass over guide wheels 19 to the lower end of the links 15. The wheels 19 are carried in brackets 20 supported by a cross member 21 in turn carried by the side members 10 of the vehicle frame.

The means for moving the yoke 17 longitudinally of the vehicle includes a motor having a cylinder 22 carried by means of the cross member 21. As clearly shown in Figures 4 to 6 inclusive the cylinder 22 is closed at one end by a head 23. Its other end is open and it is secured as by means of bolts 24 to a tank or reservoir 25 which is fastened to and supported on the members 26. At their rear ends these members are supported on the cross member 21 and near their front ends are carried by the brackets 27 mounted on the cross member 28, this latter member also forming the rear support for the transmission casing 29 of the vehicle. It will be observed that the cylinder and tank taken as a unit in effect have the desirable three point suspension, the advantages of which are well known.

The motor also includes a piston 30 slidably mounted in the cylinder 22 and having a piston rod 31 extending through the tank 25, a stuffing box 32 being provided around the rod where it issues from said tank. The free end of the rod pivotally carries the yoke 17 as at 33. It will be observed that the members 26 act as guides for the free ends of the yoke member 17, operating to prevent tilting of the same.

The motor is designed to be operated by fluid, and for this purpose a pump 34 is secured to a cross member 35 of the vehicle frame and is driven by means of a shaft 36 projecting from the transmission casing 29, it being understood that this shaft is operatively connected to the gearing within said casing. The shaft 36 is provided with two universal joints 37 so that the pump 34 will be properly operated at all times. Because of the connection above described the pump 34 will be actuated whenever the engine of the vehicle is running, it being understood that the shaft 36 is connected to the continually running gears within the transmission casing 29. The fluid discharged from the pump is carried by means of a conduit 38 to a valve which will be described presently. The inlet of the pump is connected by a conduit 39 to the tank 25.

As the fluid pump 34 is running continuously, it will be seen, when it is not placed in communication with the motor to operate the same, its discharge must be by-passed around the motor. In order to accomplish these ends and properly control the operation of the motor a valve is provided. Although not thus limited in its location, preferably this valve is disposed within the tank 25. As shown it has a casing 40 (Figure 3) which may be integral with the tank 25, and as shown in Figures 7 and 8 cut away in parts to provide communication between the tank and the interior of the valve. This casing 40 is formed with a longitudinal bore within which is fitted a bushing or lining 41 having its ends open and having its wall thickened at one end as shown at 42. This bushing is provided with three circular series of spaced openings 43, 44 and 45, respectively. The casing 40 is formed with an annular groove 46 communicating with the openings 43 and also with the pipe 38 leading from the discharge of the pump. The openings 44 in the lining 41 communicate with an annular groove 47 in the casing and this groove in turn has communication with a port 48, which extends through the wall of the cylinder 22 and opens into the same near the head thereof. The openings 45 in the lining have direct communication with the tank 25, as clearly shown in Figure 8. The lining 41 also has another series of openings 49, some of which communicate directly with the tank, as shown in Figure 7, the casing 40 being cut away for this purpose. The circulation of fluid through the various openings is controlled by a plunger fitted within the lining 41. This plunger 50 has an outside diameter such as to fit within the reduced bore 51 at the end of the lining and intermediate its ends has a portion 52 of larger diameter which fits within the larger bore of the lining 41. The plunger is formed hollow for a portion of its length and has its end closed by a plug 53 and has the openings 54, 56 and 55 through its wall affording communication between the interior of the plunger and the annular space between its exterior and the interior of the lining 41. The plunger also has a second enlarged portion 57 spaced from the portion 52, and extends outwardly through the sleeve 58 which carries a spring pressed ball adapted to cooperate with the annular grooves 60 and 61 in the plunger to retain the same in certain definite positions. The plunger projects outside the sleeve 58 through a stuffing box 62 and is pivotally connected as at 63 to a link 64 which, through suitable connections, is actuated from a hand lever 65 disposed near the operator's seat of the vehicle.

In the operation of the apparatus in order to raise the body the hand lever 65 is operated to slide the plunger of the controlling valve to the position illustrated in Figure 6. Fluid discharged from the pump will then enter through the pipe 38 and pass through the openings 43 in the lining 41 to the annular space between the plunger and the lining. It will be observed that the enlargements 52 and 57 are so spaced the said annular space affords a communication between the openings 43 and 44 in the lining. Thus the fluid will pass through the latter openings into the port 48 and thus enter the cylinder and act on the piston 30 to move it toward the left as viewed in Figure 6. This movement of the piston will carry the yoke 17 in the direction to raise the body. Referring to Figure 6 it will be observed that the end of the valve plunger projects slightly from the corresponding end of the lining and is positioned so that when the piston 30 nears the end of its stroke it will strike the said projecting end and move the plunger to the position illustrated in Figure 5. In this latter position it will be observed that communication from the pipe 38 to the port 48 is cut off by the enlargement 52 of the plunger. Furthermore, no fluid may pass out of the port 48 and consequently the piston 30 is held at the position shown in said Figure 5, that is, in the position corresponding to the full elevation of the body. As the pump is continually operating, provision must be made to take care of the discharge from the same. To this end the valve is constructed so that the discharge from the pump entering through the ports 43 of the lining passes through the openings 54 and 55 of the plunger to the interior thereof and thence outward through the openings 56 which are now in communication with the lining openings 45 which in turn communicate directly with the tank. The fluid is thus discharged from the pump to the tank and withdrawn from the tank through the inlet pipe 39. Of course, if it had been desired to raise the body only a portion of its full movement then the valve plunger would have been shifted from the position of Figure 6 to that of Figure 5 by operating the hand lever 65, and the body would be then held at the desired elevation as the piston 30 is locked against movement when the valve is in the position shown in Figure 5. It will be observed that the piston striking the valve plunger when near the end of its movement provides an automatic operation of the valve plunger to stop the motor. When it is desired to lower the body the valve plunger is shifted to the position shown in Figure 4. As shown therein the port 48 is in communication with the apertures 45 which in turn open into the tank. Consequently, fluid may be exhausted directly from the cylinder 22 through the port 48 to the tank. At the same time the discharge from the pump is by-passed around the cylinder, circulating through the openings 43 of the lining to the interior thereof and then outward through the openings 49 (Figure 7) to the tank. Part of the discharge from the pump may pass through the openings 43 of the lining into the interior of the valve plunger and thence out through the openings 56 to the tank through the apertures 45 of the sleeve.

When the valve plunger is moved from the position of Figure 5 to that shown in Figure 6, fluid might be caged between the enlargement 52 and the end 42 of the lining. A port 65 is provided to allow this fluid to escape.

It will be observed that the single acting motor herein described is mounted and arranged so that there are no stuffing boxes subjected to fluid under pressure. The stuffing box 32 does not have any differences of pressure at its opposite ends for the reason that the fluid within the tank is not under pressure. Furthermore, the arrangement of the valve within the tank eliminates several connections together with the opportunities for leakage of fluid.

Although an embodiment of the invention has been described in detail, it is to be understood that the invention is not thus limited but includes changes and modifications which come within the scope of the appended claims.

Having thus described the invention what is claimed as new and desired to be secured by Letters Patent is:—

1. In a motor vehicle having a dumping body, means to tilt the same including in combination, a tank, a motor, a pump, means to drive the pump, conduits connecting said tank, motor and pump and means within the tank adapted to place the pump in communication with the tank or motor, or the motor exhaust in communication with the tank.

2. In a motor vehicle having a dumping body, the improved means to tilt the same including, a tank, a motor secured thereto, a pump having its inlet connected to the tank, and means within the tank adapted to place the pump in communication with the tank or motor or the motor exhaust in communication with the tank.

3. In a motor vehicle having a dumping body, the improved means to tilt the same including, a tank, a motor secured thereto, a pump having its inlet connected to the tank, a valve casing within the tank having ports communicating with the pump discharge, the tank and the motor, and means within the casing adapted to be actuated to control said ports.

4. In a motor vehicle having a dumping body, the improved means to tilt the same including in combination, a pump, a tank, a cylinder having an open end secured to and in communication with said tank, a piston in said cylinder connected to actuate the body, and a valve in said tank having a movable member adapted in one position to place the discharge of the pump in communication with the motor to actuate the piston, said member when in said position being in the path of the piston at one end of its stroke whereby said member is struck by the piston and moved to cut off said communication.

5. In a motor vehicle having a dumping body, improved means to tilt the same including, a tank, a cylinder having one end closed and the other end opening into and secured to the tank, a piston slidable in the cylinder, and a valve within the tank to control the operation of the motor having a member adapted to be actuated by the piston at the end of its power stroke to stop the motor.

6. In a motor vehicle having a dumping body, improved means to tilt the same including, a tank, a cylinder having one end closed and the other end opening into and secured to the tank, a piston slidable in the cylinder, and a valve within the tank to control the operation of the motor having a member adapted to be moved into the path of the piston at one end thereof to operate the motor to raise the body, whereby said member is struck by the piston at the end of its power stroke and moved to stop the motor.

7. In a motor vehicle, in combination, a frame, a dumping body supported thereby, said frame including a pair of cross members, a tank, a cylinder secured to the tank with its axis disposed longitudinally of the frame and having a piston rod, said tank extending transversely of the cylinder, a yoke carried at the end of said rod, means to guide the ends of said yoke and support the tank comprising a pair of spaced longitudinal members carried on said cross members, and means operatively connecting the ends of the yoke and the body.

8. In a motor vehicle, in combination, a frame, a dumping body supported thereby, means to raise and lower the body including a tank, a cylinder secured thereto having its axis disposed longitudinally of the frame, means to support said cylinder on the frame intermediate the length of the cylinder, means to support the tank on the frame at two points disposed in a line transverse to the axis of the cylinder and spaced on opposite sides of said axis, and a piston in the cylinder operatively connected to the body.

9. In a motor vehicle having a dumping body, the improved means to tilt said body including a pump, a tank, a motor comprising a cylinder closed at one end and in communication with said tank at the other, a conduit connecting the tank and pump inlet, a valve body having a port in communication with the outlet of the pump, two ports in communication with the tank one on each side of the first mentioned port, a port in communication with the operative end of said cylinder, and a plunger in the body controlling said ports.

10. In a motor vehicle having a dumping body, the improved means to tilt said body including a pump, a motor, a tank, a conduit between the pump inlet and said tank, and a valve constructed and arranged to place the pump outlet in communication with the tank; or in communication with the motor and cut off communication between said outlet and tank; or to place the pump outlet and motor in communication with the tank; or to place the pump outlet in communication with the tank and cut off communication between the motor and the tank and pump outlet.

11. In apparatus of the character described, in combination, a cylinder having one end open and the other closed, a tank secured to the open end of said cylinder and in communication therewith, a piston in said cylinder having a rod extending through the tank, a valve in said tank, a conduit formed in said cylinder and tank walls extending from adjacent the closed end of the cylinder to said valve, and a fluid supply pipe connected to said valve, whereby the valve controls the flow of fluid to the cylinder, and from the cylinder to the tank.

12. In a motor vehicle having a dumping body, the improved means to tilt said body including a tank disposed transversely of the vehicle frame and supported at its ends, a cylinder having an open end rigidly secured to said tank intermediate the ends of said tank, said cylinder being in communication with said tank through its open end, and means supporting the cylinder on the vehicle frame at a point spaced from said tank.

In testimony whereof I affix my signature.

HAROLD D. CHURCH.